United States Patent
Asakawa et al.

(10) Patent No.: US 8,430,437 B2
(45) Date of Patent: Apr. 30, 2013

(54) CRASH CAN MADE OF ALUMINUM-ALLOY CASTING

(75) Inventors: Motoyasu Asakawa, Hiroshima (JP); Katsuya Nishiguchi, Hiroshima (JP); Takahiro Kimura, Hiroshima (JP); Nobuyuki Oda, Hiroshima (JP); Kojiro Tanaka, Hiroshima (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 13/349,759

(22) Filed: Jan. 13, 2012

(65) Prior Publication Data

US 2012/0205927 A1 Aug. 16, 2012

(30) Foreign Application Priority Data

Feb. 14, 2011 (JP) ................................. 2011-028172

(51) Int. Cl.
*B60R 19/34* (2006.01)

(52) U.S. Cl.
USPC .......................................... 293/133; 293/132

(58) Field of Classification Search .................. 293/132, 293/133; 188/377; 296/187.09, 187.1
See application file for complete search history.

(56) References Cited

U.S. PATENT DOCUMENTS

| 7,357,445 | B2 * | 4/2008 | Gross et al. ............... 296/187.09 |
| 2010/0032970 | A1 | 2/2010 | Nishiguchi et al. |
| 2010/0066124 | A1 | 3/2010 | Terada et al. |

FOREIGN PATENT DOCUMENTS

| JP | 2002-012165 A | 1/2002 |
| JP | 2002-039245 A | 2/2002 |

* cited by examiner

*Primary Examiner* — Joseph D. Pape
*Assistant Examiner* — Dana Ivey
(74) *Attorney, Agent, or Firm* — Studebaker & Brackett PC; Donald R. Studebaker

(57) ABSTRACT

A crash can is made of aluminum-alloy casting and provided between a side frame extending in a vehicle longitudinal direction at a side portion of a vehicle and an end portion of a bumper reinforcement extending in a vehicle width direction. The crash can comprises a hollow tube portion extending in the vehicle longitudinal direction and having a cross-shaped section. At least one of an outwardly-projecting corner portion and an inwardly-projecting corner portion of the tube portion is formed by a groove such that a thickness thereof is thinner than that of the other portion of the tube portion. Accordingly, an impact which a vehicle body or a passenger may receive in a vehicle collision can be reduced by the crash can.

5 Claims, 7 Drawing Sheets

Vehicle Forward Side

CRASH CAN MADE OF ALUMINUM-ALLOY CASTING

BACKGROUND OF THE INVENTION

The present invention relates to a crash can which is made of aluminum-alloy casting for a vehicle.

Vehicles are equipped with an impact absorption device to ensure the safety of passengers or reduce damages of a vehicle body in a vehicle collision against another vehicle or any obstacle, such as a building, due to driving mistakes. A crash can (box) is known as a representative impact absorption device, which is provided between a bumper reinforcement provided inside a bumper of the vehicle and an end portion of a side frame of the vehicle body.

The above-described crash can, which is generally made of steel, crashes in a vehicle longitudinally direction in bellows shape with buckling deformation in a vehicle frontal collision or a vehicle offset collision, and thereby absorbs a collision energy. The conventional crash can made of steel is formed by a pair of inside and outside members which have a U-shaped section, respectively, and connected to each other so as to provide a hollow tube shape. It is also known that the closed cross section of this crash can is formed in a cross shape or a tumbler shape, or it is formed to have beads at its inside wall face and its outside wall face. US patent application publication No. 2010/066124, for example, discloses the crash can made of steel and having the closed cross section formed in the cross shape, in which the concave portion provided at the front end face of the crash can engages with the convex portion having the U-shaped section which is formed at the rear face of the bumper beam to extend in the vehicle width direction.

It is also known that the crash can is made of aluminum alloy. Japanese Patent Laid-Open Publication No. 2002-39245, for example, discloses the tube crash can made of aluminum-alloy casting, in which the wall thickness of the crash can changes continuously or partially in its axial direction. Further, Japanese Patent Laid-Open Publication No. 2002-12165 discloses the crash can made of aluminum-alloy extrusion having the hollow rectangular section, in which the wall face of the crash can outwardly projects to provide the convex portion which extends in the axial direction and have the U-shaped section.

Further, another structure of the crash can which is disclosed in US patent application publication No. 2010/0032970 is also known.

Herein, the crash can made of aluminum alloy may be advantageous in providing a lightweight vehicle body, compared to the one made of steel, despite its wall thickness being relatively thicker to ensure the proper strength. However, in the case of the crash can made of aluminum-alloy extrusion, the same sectional shape basically extends over a whole length of the crash can in the axial direction. Accordingly, it may be difficult to change the sectional shape of the crash can made of aluminum-alloy extrusion in the axial direction in order to effectively obtain the impact absorption function or provide connecting flanges at both ends. Meanwhile, in the case of the crash can made of aluminum-alloy casting disclosed in the above-described second patent publication, while the wall thickness of the tube portion may be possibly changed or the flanges may be possibly provided, it has been desired to obtain the further effective impact-absorption function.

That is, when the collision load is added to the crash can, the crash can resists against the collision load, so that the load received by the vehicle body may increase until the buckling deformation occurs initially. Then, the load may decrease in accordance with the occurrence of the buckling deformation. Thus, a so-called initial peak may occur. After the crashing of the crash can caused by this initial buckling deformation, the crash can may not provide any effective absorption effect of the collision energy. Consequently, the damages received by the vehicle body and the impact received by passengers may become improperly large.

Even in a case in which the crashing of the crash can is not caused by the initial buckling deformation, the load received by the vehicle body may increase until the next buckling deformation occurs. Accordingly, if the subsequent buckling deformations do not happen properly continuously after the initial buckling deformation, the effective absorption of the collision energy may not be achieved, so that the impact received by the vehicle body may be improperly large.

SUMMARY OF THE INVENTION

An object of the present invention is to provide a crash can made of aluminum-alloy casting which can effectively absorb the collision energy, thereby reducing the damages received by the vehicle body or the impact received by passengers.

According to the present invention, there is provided a crash can made of aluminum-alloy casting which is provided between a side frame extending in a vehicle longitudinal direction at a side portion of a vehicle and an end portion of a bumper reinforcement extending in a vehicle width direction, comprising a hollow tube portion extending in the vehicle longitudinal direction and having a cross-shaped section, wherein at least one of an outwardly-projecting corner portion and an inwardly-projecting corner portion of the tube portion is formed such that a thickness thereof is thinner than that of the other portion of the tube portion.

That is, the buckling deformation which occurs at the tube portion when the collision load acts on the crash can is a phenomena in which the wall of the tube portion deforms laterally (in a direction perpendicular to the vehicle longitudinal direction) when the load has reached a limit value. Briefly speaking, the collision load causes a force to deform a peripheral wall of the tube portion inwardly or outwardly. In a case in which the tube portion is formed to have the cross-shaped section, an outward force acts on one pair of four projecting portions of the tube portion, while an inward force acts on the other pair of four projecting portions of the tube portion (herein, each of the pairs of four projecting portions comprises two projecting portions which are positioned so as to oppositely face to each other).

The corner portions of the tube portion of the crash can according to the present invention are formed such that the thickness thereof is thinner. Accordingly, the tube portion can easily deform such that bending of the corner portions is returned so as to stretch by the above-described inward or outward forces. This means that when the outward force acts on the above-described one pair of four projecting portions, the bending of the corner portions of these projecting potions stretches, so that the width of the tip of these projecting portions becomes narrower and these projecting portions can easily deform so as to project outwardly. Meanwhile, when the inward force acts on the above-described other pair of four projecting portions, the bending of the corner portions of these projecting potions stretches, so that the width of the tip of these projecting portions becomes wider and these projecting portions can easily deform inwardly. That is, the above-described thinner-thickness forming of the corner portions causes the buckling deformation in which the width of the tip of the one pair of projecting portions becomes narrower and these projecting portions easily deform so as to project outwardly, while the width of the tip of the other pair of projecting portions becomes wider and these projecting portions easily deform so as to project inwardly.

Thus, the tube portion of the crash can has the buckling deformation along with the outward deformation of the one pair of four projecting portions and the inward deformation of the other pair of four projecting portions. When the projecting portions deform outwardly or inwardly and thereby the tube portion has the buckling, a force to deform the projecting portions in a reverse direction (inwardly or outwardly) acts on a portion adjacent to the buckling portion in the vehicle longitudinal direction. That is, at this moment, the tube portion has the buckling deformation along with the inward deformation of the one pair of four projecting portions having the wide tip's width and the outward deformation of the other pair of four projecting portions having the narrow tip's width. In this case as well, since the corner portions of the tube portion are formed such that the thickness thereof is thinner relatively, the buckling deformation in the same manner can easily occur.

As described above, in the case of the crash can according to the present invention, when the collision load is added, a first buckling deformation pattern in which the above-described one pair of projecting portions deforms outwardly and the above-described other pair of projecting portions deforms inwardly, and a second buckling deformation pattern in which the one pair of projecting portions deforms inwardly and the other pair of projecting portions deforms outwardly occur repeatedly in the vehicle longitudinal direction, so that the tube portion deforms (crashes) in the bellows shape. Herein, since the tube portion is formed to have the above-described relatively-thinner corner portions, the above-described buckling deformation along with the repeated first and second deformation patterns can smoothly occur. Thereby, according to the present invention, the collision energy can be effectively absorbed, so that the damages received by the vehicle body or the impact received by passengers can be properly reduced.

According to an embodiment of the present invention, a flat portion of the tube portion which is formed between a pair of outwardly-projecting corner portions which are adjacently positioned or between the outwardly-projecting corner portion and the inwardly-projecting corner portion which are adjacently positioned is formed such that a thickness of part of the flat portion is thinner than that of the other part of the flat portion. Thereby, the flat portion between the corner portions can easily have the buckling deformation, so that the above-described outward deformation of the projecting portions having the narrow tip's width and the above-described inward deformation of the projecting portions having the wide tip's width can easily occur. That is, the buckling deformation along with the first and second deformation patterns can smoothly occur.

According to another embodiment of the present invention, the thinner-thickness forming is achieved by forming a groove extending in the vehicle longitudinal direction on an outer face or an inner face of the tube portion. Thereby, the groove causes the tube portion to deform easily, so that the buckling deformation along with the first and second deformation patterns can smoothly occur.

According to another embodiment of the present invention, the thinner-thickness forming is achieved by making the tube portion in such a manner that the thickness thereof changes continuously. Thereby, the buckling deformation along with the first and second deformation patterns can smoothly occur as well.

According to another embodiment of the present invention, the tube portion is formed in a tapering shape such that a front portion thereof is slender compared to a rear portion thereof. Thereby, the buckling deformation of the tube portion starts from its front end side, and then the buckling deformations along with the first and second deformation patterns repeatedly occur. Accordingly, the deformation (crash) in the bellows shape can smoothly occur.

Herein, it may be preferable that the aluminum-alloy casting making the crash can have a mechanical property that a 0.2% proof stress is 70 MPa or greater, a tensile strength is 120 MPa or greater, and an elongation is 10% or greater.

Other features, aspects, and advantages of the present invention will become apparent from the following description which refers to the accompanying drawings.

DETAILED DESCRIPTION OF THE INVENTION

Hereafter, preferred embodiments of the present invention will be descried referring to the accompanying drawings. However, these embodiments merely show an example of the present invention, and any application or use of the present invention should not be limited by these embodiments.

Figure 1:
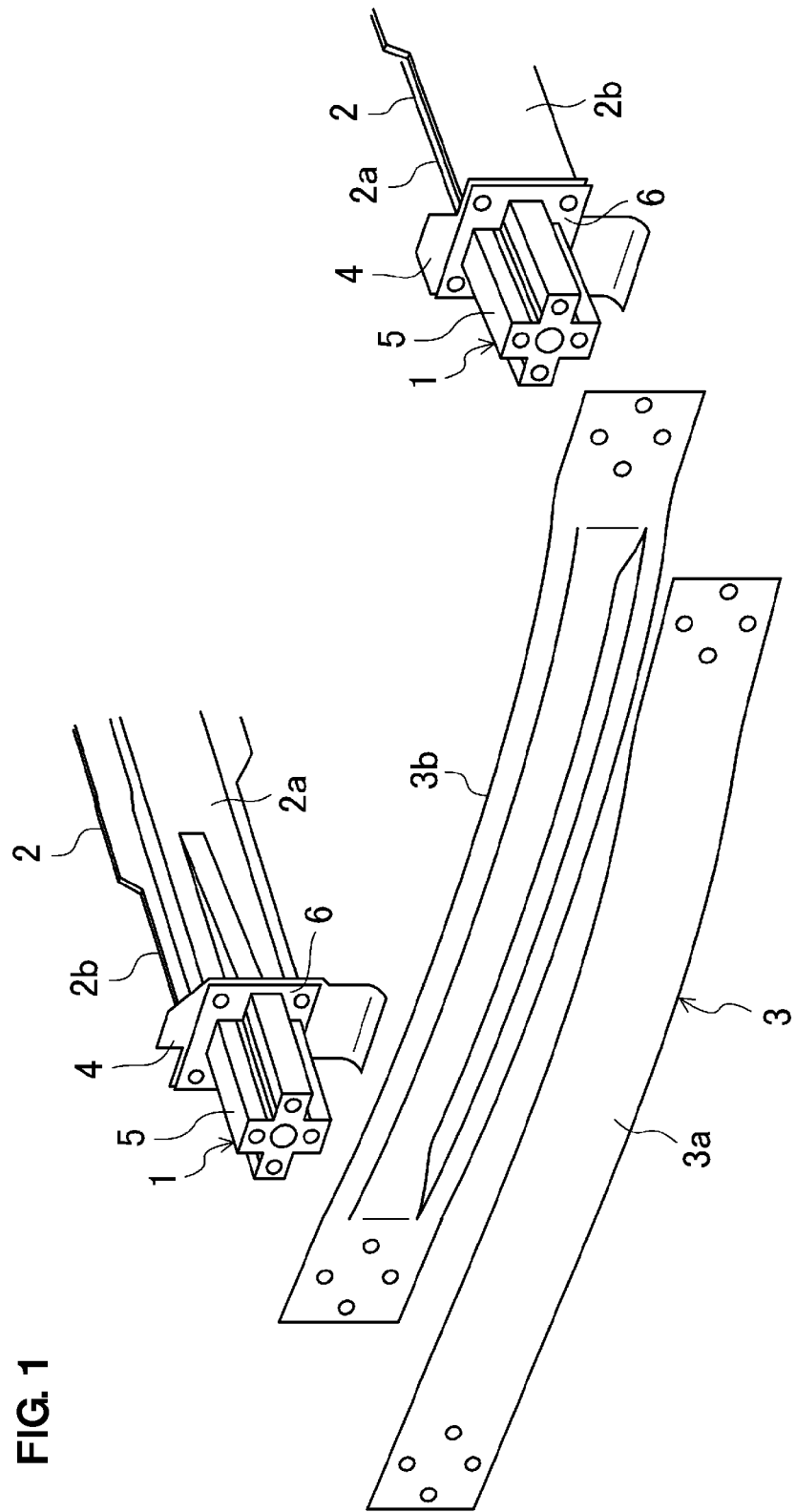
FIG. 1 is an exploded perspective view showing a vehicle-body structure of a vehicle front portion according to an embodiment of the present invention.

FIG. 1 is an exploded perspective view showing a vehicle-body structure of a vehicle front portion. In this figure, reference character 1 denotes a pair of crash cans which is made of aluminum-alloy casting, reference character 2 denotes a pair of front side frames which extends in a vehicle longitudinal direction at both side portions of a vehicle, and reference character 3 denotes a bumper reinforcement (bumper beam) which extends in a vehicle width direction. The crash can 1 is provided to interconnect a front end of the front side frame 2 and an end portion of the bumper reinforcement 3.

The front side frame 2, which is a structure body having a closed cross section and extending in the vehicle longitudinal direction, is comprised of an inner member 2a having a U-shaped section and an outer member 2b having a flat plate shape which are connected to each other. An attaching plate 4 is fixed to a front end face of the front side frame 2 such that a plate face thereof faces vehicle forwardly. The bumper reinforcement 3 is comprised of a front member 3a having a flat plate shape and a rear member 3b having a U-shaped section which are connected to each other. A bumper face (not illustrated) is attached to the bumper reinforcement 3.

Figure 2:
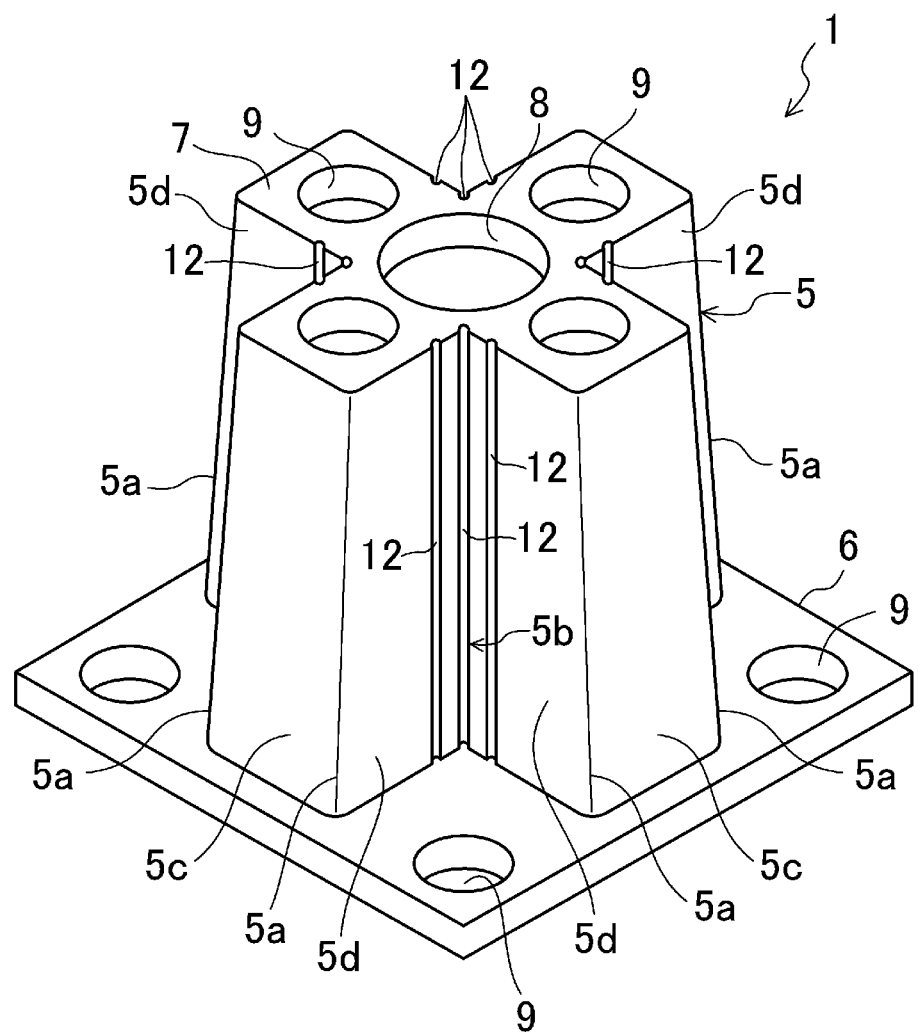
FIG. 2 is a perspective view of a crash can according to the embodiment of the present invention.
Figure 3:
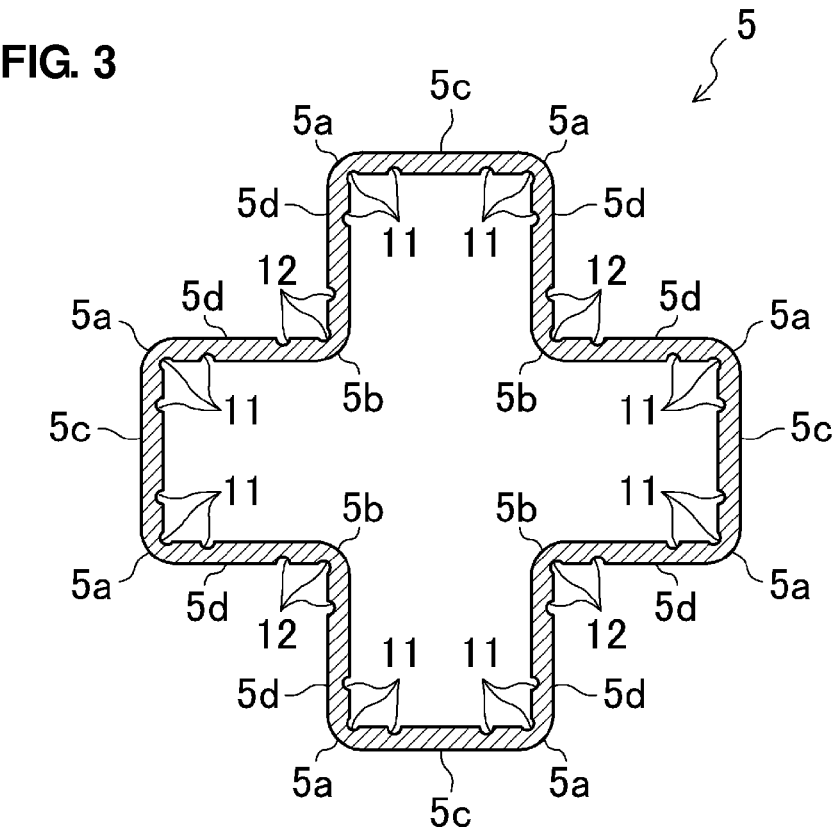
FIG. 3 is a lateral sectional view of a tube portion of the crash can.

The crash can 1, as shown in FIG. 2, comprises a hollow tube portion 5 which extends in the vehicle longitudinal direction and is formed in a tapering shape such that its front portion is slender compared to its rear portion. At a rear end of the tube portion 5 is provided a connecting flange 6 which projects outwardly. The tube portion 5 is formed to have a cross-shaped section such that it has eight outwardly-projecting corners 5a and four inwardly-projecting corners 5b as shown in FIG. 3 and others.

A lightweight hole 8 opens at a center of a front wall 7 which closes a front end of the tube portion 5 for light weight, and bolt holes 9 open at four cross-shaped projection portions of the front wall 7. The front end of the crash can 1 is connected to the bumper reinforcement 3 by the bolt holes 9. At four corners of the connecting flanges 6 are formed bolt holes 9, and a rear end of the crash can 1 is connected to the attaching plate 4 at the front end of the front side frame 2 by these bolt holes 9.

Herein, an inner groove 11 which extends in the vehicle longitudinal direction is formed at an inner face of each of the outwardly-projecting corner portions 5a of the tube portion 5, so that the outwardly-projecting corner portions 5a is formed such that the thickness thereof is thinner than that of the other portion of the tube portion 5. An outer groove 12 which extends in the vehicle longitudinal direction is formed at an outer face of each of the inwardly-projecting corner portions 5b of the tube portion 5, so that the inwardly-projecting corner portions 5a is formed such that the thickness thereof is thinner than that of the other portion of the tube portion 5 as well. Further, the inner grooves 11 and the outer groove 12 which extend in the vehicle longitudinal direction, respectively, are formed at a flat portion 5c between the outwardly-projecting corner portions 5a adjacent to each other in a peripheral direction and a flat portion 5d between the outwardly-projecting corner portion 5a and the inwardly-projecting corner portion 5b adjacent to each other in the peripheral direction, so that the flat portions 5c, 5d are formed such that the thickness thereof is thinner than that of the other part of the flat portions 5c, 5d. That is, the two inner grooves 11 are formed at the two flat portions 5c, 5d positioned on the both side of the inner groove 11 formed at the outwardly-projecting corner portion 5a, and the two outer grooves 12 are formed at the two flat portions 5c, 5d positioned on the both side of the outer groove 12 formed at the inwardly-projecting corner portion 5b.

Accordingly, the two inner grooves 11 are provided at each of the flat portions 5c, and the single inner groove 11 and the single outer groove 12 are provided at each of the flat portions 5d. Each of the two inner grooves 11 at the flat portion 5c extends in the vehicle longitudinal direction at a specified position which is located ¼ of the width of the flat portion 5c away from the outwardly-projecting corner portion 5a. The inner groove 11 at the flat portion 5d extends in the vehicle longitudinal direction at a specified position which is located ¼ of the width of the flat portion 5d away from the outwardly-projecting corner portion 5a as well. The outer groove 12 at the flat portion 5d extends in the vehicle longitudinal direction at a specified position which is located ¼ of the width of the flat portion 5d away from the inwardly-projecting corner portion 5b.

[Method of Manufacturing Crash Can]

Figure 4:
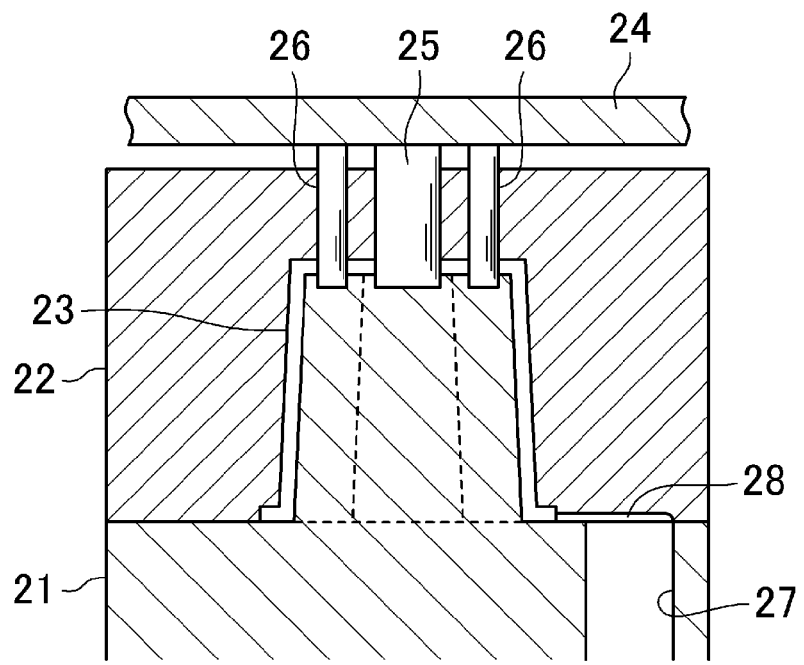
FIG. 4 is a sectional view schematically showing a metal mold for crash-can manufacturing.

It may be preferable that a vacuum casting device with a mold-fastening force of 500t be used for manufacturing the crash can 1. FIG. 4 schematically shows a metal mold of the device. In this figure, reference character 21 denotes a lower mold and reference character 22 denotes an upper mold, and a cavity for molding crash can 23 is formed by the both molds 21, 22. Reference character 24 denotes a core movable plate, at which a core 25 to form the above-described lightweight hole 8 and cores 26 to form the above-described bolt holes 9 are provided, respectively. Reference character 27 denotes a plunger hole in which a plunger for pouring molten metal reciprocates, and reference character 28 denotes a path of molten metal.

The tube portion 5 of the crash can 1 is formed in a tapering shape such that its front portion is slender compared to its rear portion, and the inner grooves 11 and the outer grooves 12 extend in the vehicle longitudinal direction, respectively. Therefore, as apparent from FIG. 4, the lower mold 21 and the upper mold 22 can be constituted as not a split type of mold, but a simple two-direction pulling type of mold.

Herein, it may be preferable to use the aluminum alloy containing Mn: 1.4 w %-1.6w %, Si: 0.2 w %-5.0 w %, Cu: 0.05 w %-0.35 w %, Mg: 0.1 w %-0.3 w %, Fe: 0.5 w % -0.7 w %, Ti: 0.1 w %-0.3 w %, and Al of the rest part thereof including as little impurities as possible. Thereby, the crash can 1 made of aluminum-alloy casting which has a mechanical property in which a 0.2% proof stress is 70 MPa or greater, a tensile strength is 120 MPa or greater, and an elongation is 10% or greater can be provided.

For example, in a case in which by using the aluminum alloy containing Mn: 1.56 w %, Si: 0.22 w %, Cu: 0.05 w %, Mg: 0.16 w %, Fe: 0.65 w %, Ti: 0.15 w %, and Al of the rest part thereof including as little impurities as possible, the casting is conducted on condition of a plunger speed: 1.50 m/sec, a cavity-inside vacuum: 98 kPa, and a mold temperature: 150-160° C., the crash can 1 made of aluminum-alloy casting which has the mechanical property in which the 0.2% proof stress is 100 MPa, the tensile strength is 220 MPa, and the elongation is about 80% can be provided.

[Crashing Deformation of Crash Can]

Figure 5:
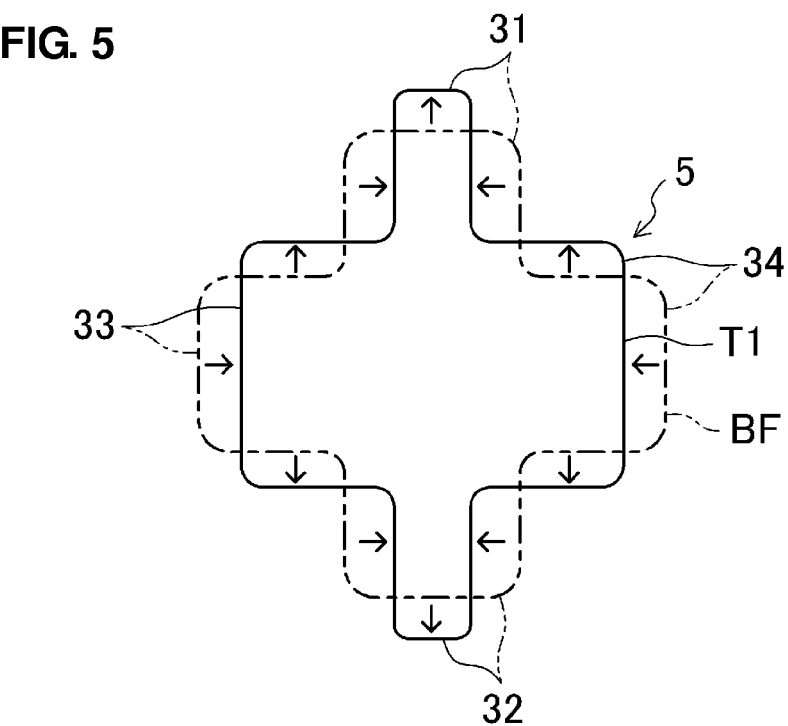
FIG. 5 is a diagram showing a first deformation pattern of the tube portion of the crash can.
Figure 6:
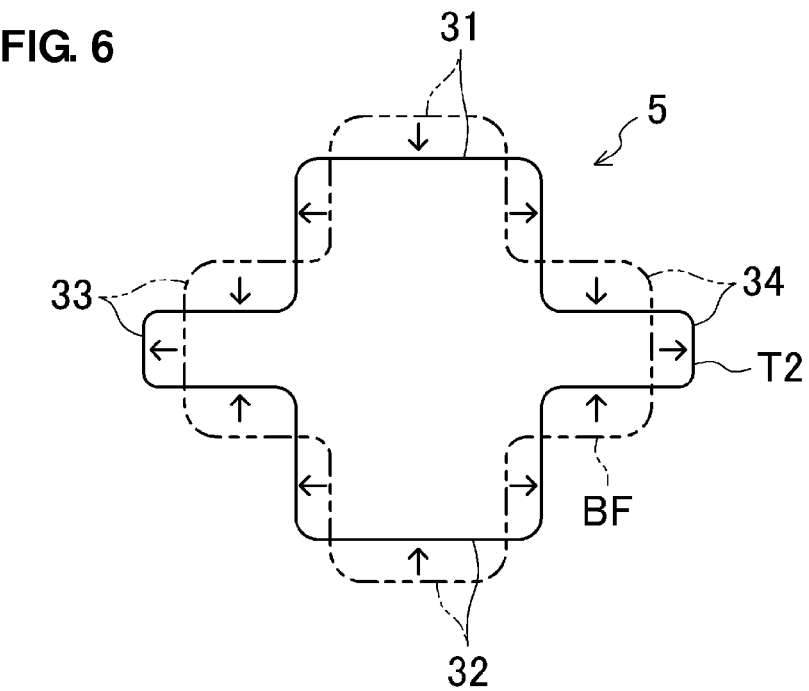
FIG. 6 is a diagram showing a second deformation pattern of the tube portion of the crash can.

When the collision load is added to the crash can 1 via the bumper reinforcement 3, the tube portion 5 starts its buckling deformation with a first deformation pattern T1 shown by a solid line in FIG. 5 and a second deformation pattern T2 shown by a solid line in FIG. 6 which occur repeatedly in the vehicle longitudinal direction from an initial sate having its basic sectional shape "cross shape" BF shown by a two-dotted broken line in FIG. 5. In the first deformation pattern T1 shown in FIG. 5, upper and lower projecting portions 31, 32 deform outwardly in the vertical direction with their width becoming narrower, while right and left projecting portions 33, 34 deform inwardly in the lateral direction with their width becoming wider. Meanwhile, in the second deformation pattern T2 shown in FIG. 6, the upper and lower projecting portions 31, 32 deform inwardly in the vertical direction with their width becoming wider, while the right and left projecting portions 33, 34 deform outwardly in the lateral direction with their width becoming narrower.

Figure 7:
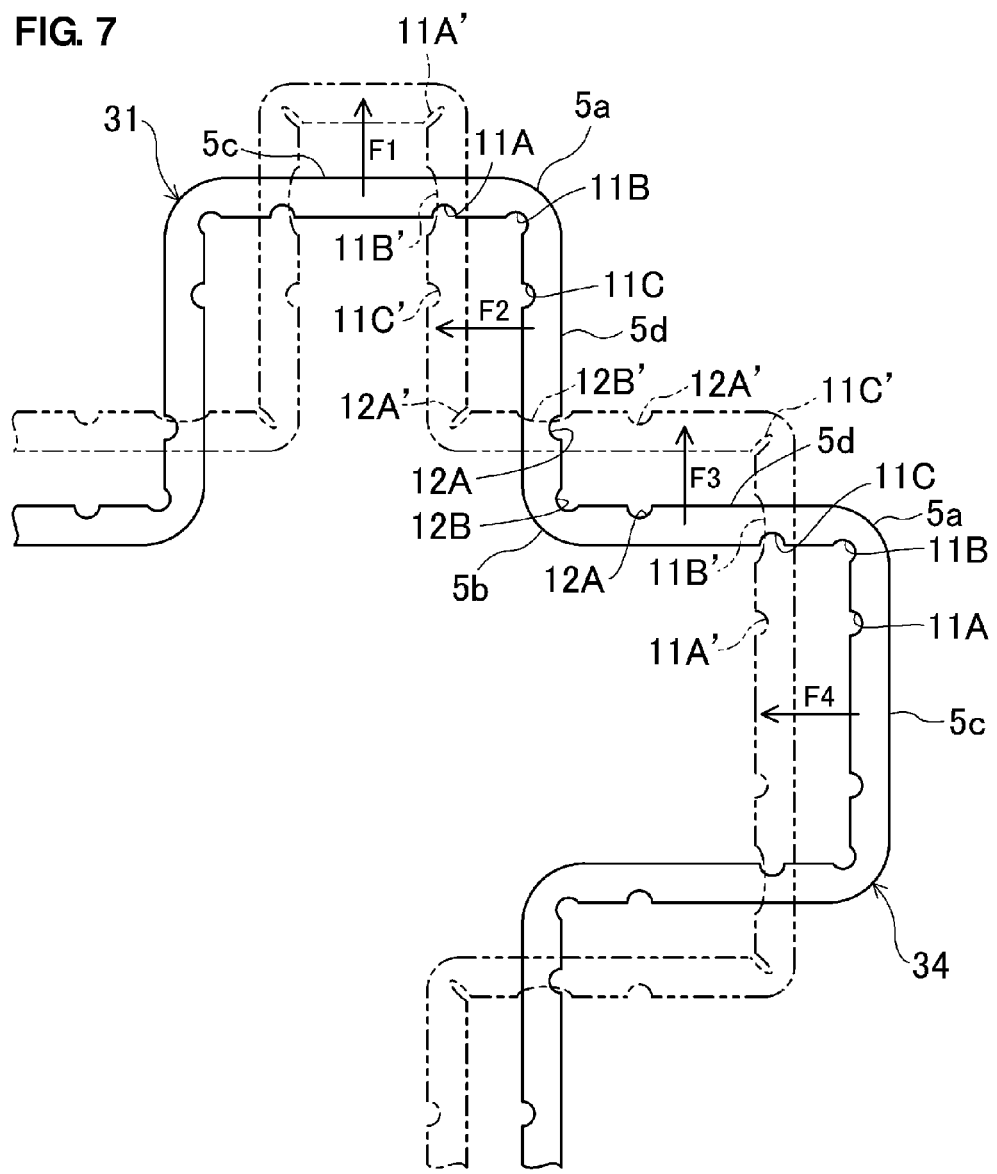
FIG. 7 is an enlarged lateral sectional view showing a deformation manner of the tube portion of the crash can, omitting illustration of hutching.

Next, the operations of the inner grooves 11 and the outer grooves 12 when the tube portion 5 has the buckling deformation with the above-described deformation patterns T1, T2 will be described referring to FIG. 7. In this figure, reference character 11A denotes the inner groove formed at the flat portion 5c, reference character 11B denotes the inner groove formed at the outwardly-projecting corner portion 5a, reference character 11C denotes the inner groove formed at the flat portion 5d, reference character 12A denotes the outer groove formed at the flat portion 5d, and reference character 12B denotes the outer groove formed at the inwardly-projecting corner portion 5b.

Herein, when an outward force F1 (acting upwardly in FIG. 7) is added to the flat portion 5c of the projecting portion 31 due to the collision load, a bending force acts on the flat portion 5c so as to convex the flat portions 5c, so that a stress concentrates in a specified portion of the flat portion 5a which is positioned at the inner groove 11A. Thereby, this specified portion deforms easily so as to bend as shown by a two-dotted broken line (the inner groove 11A→11A').

When the outward force F1 (upwardly) is added to the flat portion 5c of the projecting portion 31, an inward force F2 acts on the flat portion 5d of the projecting portion 31. Herein, since the outwardly-projecting corner portion 5a of the projecting portion 31 is formed to be thinner by the inner groove 11B, it deforms easily so as to stretch as shown by the two-dotted broken line in the figure (the inner groove 11B→11B').

When the outward force F1 (upwardly) is added to the projecting portion 31 due to the collision load, a force F3 acting in the same direction is added to the flat portion 5d of the adjacent projection portion 34. Consequently, a bending stress concentrates in a specified portion of the flat portion 5d which is positioned at the outer groove 12A. Thereby, this specified portion bends easily as shown by a two-dotted broken line to become an inwardly-projecting corner (the outer groove 12A→12A').

Herein, since the inwardly-projecting corner portion 5b between the projecting portions 31, 34 is formed to be thinner by the outer groove 12B, it deforms easily so as to stretch as shown by the two-dotted broken line in the figure due to the inward force F2 acting on the flat portion 5d of the projecting portion 31 and the outward force F3 acting on the flat portion 5d of the projecting portion 34 (the inner groove 12B→12B').

When the outward force F3 (upwardly) is added to the projecting portion 34 due to the collision load, an inward force F4 is added to the flat portion 5c of the adjacent projection portion 34. Herein, since the outwardly-projecting corner portion 5a of the projecting portion 34 is formed to be thinner by the inner groove 11B, it deforms easily so as to stretch as shown by the two-dotted broken line in the figure due to the forces F3, F4 (the inner groove 11B→11B').

As apparent from the above description, when the outward force is added to the projecting portion, the inner grooves 11A of the flat portion 5c, the inner groove 11B of the outwardly-projecting corner portion 5a, and the outer groove 12A of the flat portion 5d cause the outwardly-projecting deformation having the narrow tip's width of the projecting portion. Meanwhile, when the inward force is added to the projecting portion, the inner grooves 11B of the outwardly-projecting corner portion 5a, the inner groove 11C of the flat portion 5d, and the outer groove 12B of the inwardly-projecting corner portion 5b cause the inwardly-projecting deformation having the wide tip's width of the projecting portion.

Figure 8:
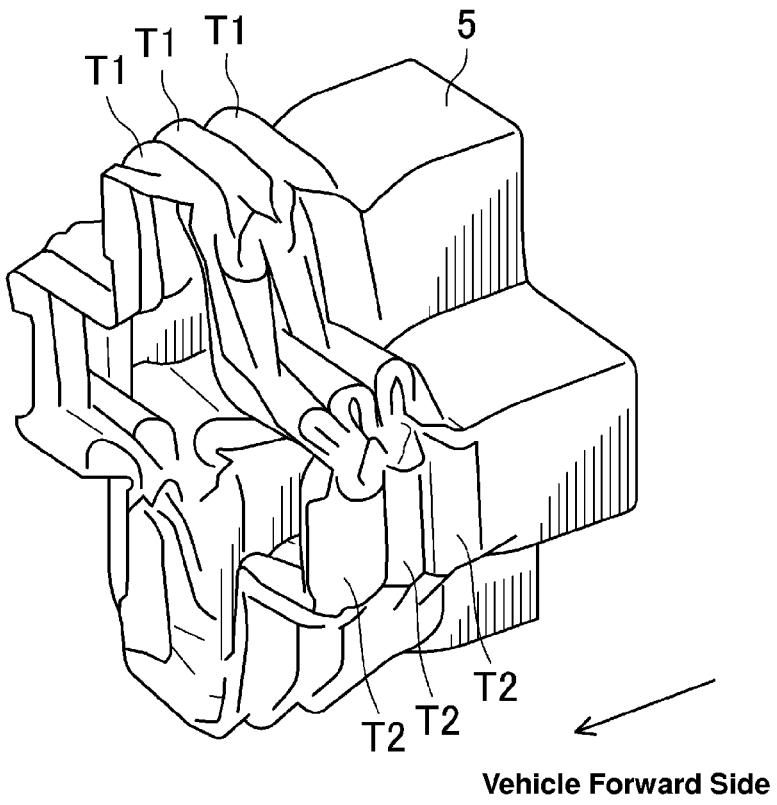
FIG. 8 is a perspective view showing a deformation state of the tube portion of the crash can.

The repeated occurrences of the above-described first and second deformation patterns T1, T2 are caused by the occurrences of the outwardly-deforming force acting on the specified portion adjacent to the buckling portion when the metal plate is bent inwardly, for example. As a result, the tube portion 5 of the crash can 1 deforms (crashes) in the vehicle longitudinal direction in the bellows shape as shown in FIG. 8.

Since the tube portion 5 has the cross-shaped section, even in the case of the vehicle offset collision in which the input direction of the collision load is offset vertically or laterally, in addition to the vehicle frontal collision, the cross-shaped projecting portions 31-34 can support so as to prevent any falling-down deformation of the tube portion 5. Thereby, the bellows-shaped deformation (crashing) with the repeated first and second deformation patterns T1, T2 can be made occur.

Figure 9:
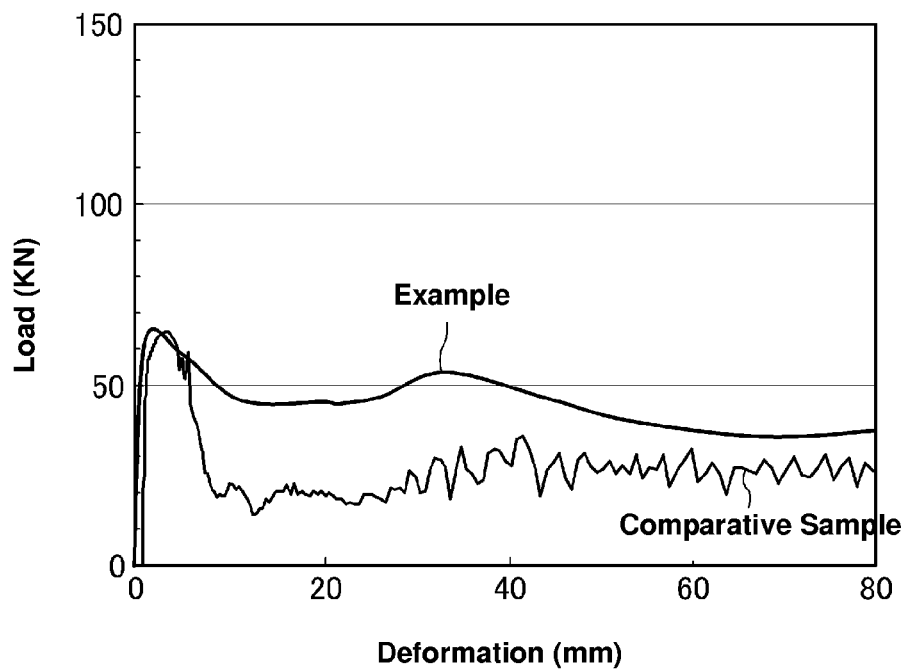
FIG. 9 is a graph showing respective load-deformation properties of an example and a comparative sample of the crash can.

FIG. 9 shows results of crashing test of the crash can made of aluminum-alloy casting having the cross-shaped section (load-crashing deformation data). An example has the above-described inner groove 11 and outer groove 12, while a comparative sample has no such inner and outer grooves.

According to the comparative sample, after the load peak occurs in an initial stage of the collision, the load value decreases greatly and then stays at a low load value. This load-deformation property is caused by breakage of the tube portion due to the initial buckling deformation of the tube portion.

By contrast, according to the example, the load peak in the initial stage occurs similarly to the above-described comparative sample, but the decrease of the load value after the load peak's occurrence is relatively small and the load value stays at a relatively high value. This means that the tube portion has repeated buckling deformations, without being broken by the initial buckling deformation. This is because the above-described inner and outer grooves 11, 12 cause the repeated buckling deformations with the first and second deformation patterns T1, T2. Accordingly, a substantially flat load-deformation property can be provided. Thus, according to the present invention, the effective absorption of the collision energy can be achieved, so that the damages which the vehicle body may receive or the impact which passengers may receive can be reduced properly.

Figure 10:
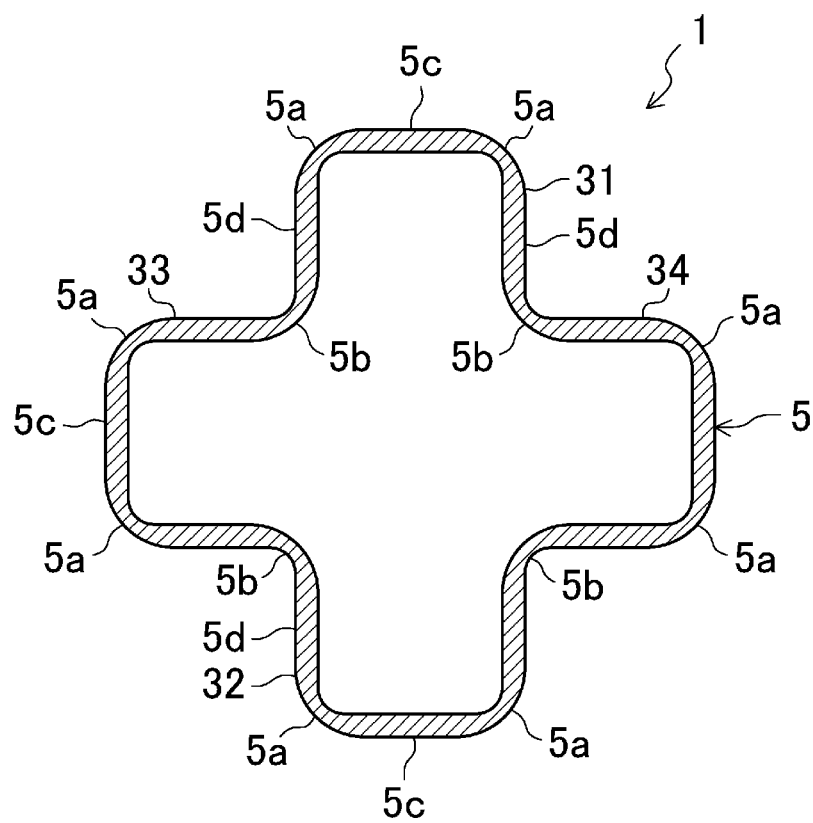
FIG. 10 is a lateral sectional view of the crash can according to another embodiment.

FIG. 10 shows the crash can of another embodiment of the present invention. In this crash can 1, the eight outwardly-projecting corner portions 5a and the four inwardly-projecting corner portions 5b of the tube portion 5 having the cross-shaped section are formed such that the thickness thereof is thinner than that of the other portion of the tube portion 5 by changing their thickness continuously, differently from the above-described embodiment in which the inner and outer grooves 11, 12 are used. Herein, the flat portions 5c, 5d have no partially-thinner part thereof.

Thus, since the eight outwardly-projecting corner portions 5a and the four inwardly-projecting corner portions 5b of the tube portion 5 are formed such that the thickness thereof is thinner than that of the other portion of the tube portion 5, these corner portions 5a, 5b can easily deform so as to stretch from their initials bending state as well. These corner portions 5a, 5b can promote the outward projection of the projecting portions 31-34 having the narrow tip's width and the inward projection of the projecting portions 31-34 having the wide tip's width, so that the buckling deformation with the repeated first and second deformation patterns T1, T2 can be provided to the tube portion 5 smoothly.

The present invention should not be limited to the above-described embodiments, and any other modifications and improvements may be applied within the scope of a spirit of the present invention.

What is claimed is:

1. A crash can made of aluminum-alloy casting which is provided between a side frame extending in a vehicle longitudinal direction at a side portion of a vehicle and an end portion of a bumper reinforcement extending in a vehicle width direction, comprising:

a hollow tube portion extending in the vehicle longitudinal direction and having a cross-shaped section, the tub portion including eight outwardly-projecting corner portions, four inwardly-projecting corner portions, eight flat portions which are positioned between the outwardly-projecting corner portions and the inwardly-projecting corner portions, and four flat portions which are positioned between the outwardly-projecting corner portions, wherein a groove extending in the vehicle longitudinal direction is formed on an outer face or an inner face of each of said eight outwardly-projecting corner portions and said four inwardly-projecting corner portions of the tube portion are formed such that a thickness of a tube wall of said each of the eight outwardly-projecting corner portions and the four inwardly-projecting corner portions of the tube portion is partially thin.

2. The crash can made of aluminum-alloy casting of claim 1, wherein each of said twelve flat portions of the tub portion is formed such that a thickness of a tube wall thereof is partially thin.

3. The crash can made of aluminum-alloy casting of claim 2, wherein a groove extending in the vehicle longitudinal direction is formed on an outer face or an inner face of said each of the twelve flat portions of the tube portion such that the thickness of the tube wall thereof is partially thin.

4. The crash can made of aluminum-alloy casting of claim 1, wherein said tube portion is formed in a tapering shape such that a front portion, in the vehicle longitudinal direction, thereof is slender compared to a rear portion, in the vehicle longitudinal direction, thereof.

5. The crash can made of aluminum-alloy casting of claim 1, wherein the aluminum-alloy casting has a mechanical property that a 0.2% proof stress is 70 MPa or greater, a tensile strength is 120 MPa or greater, and an elongation is 10% or greater.

* * * * *